United States Patent
Saleh et al.

(10) Patent No.: US 9,710,369 B2
(45) Date of Patent: Jul. 18, 2017

(54) SYSTEM AND METHOD FOR ENTITY GENERATION

(71) Applicant: Red Hat, Inc., Raleigh, NC (US)

(72) Inventors: Adam Saleh, Brno (CZ); Elyezer Mendes Rezende, Pouso Alegre (BR)

(73) Assignee: RED HAT, INC., Raleigh, NC (US)

( * ) Notice: Subject to any disclaimer, the term of this patent is extended or adjusted under 35 U.S.C. 154(b) by 136 days.

(21) Appl. No.: 14/621,244

(22) Filed: Feb. 12, 2015

(65) Prior Publication Data

US 2016/0239360 A1   Aug. 18, 2016

(51) Int. Cl.
  *G06F 11/26* (2006.01)
  *G06F 11/36* (2006.01)
  *G06F 11/22* (2006.01)

(52) U.S. Cl.
  CPC ......... *G06F 11/3688* (2013.01); *G06F 11/22* (2013.01); *G06F 11/26* (2013.01)

(58) Field of Classification Search
  CPC ................................ G06F 11/22; G06F 11/26
  See application file for complete search history.

(56) References Cited

U.S. PATENT DOCUMENTS

| | | | | |
|---|---|---|---|---|
| 6,167,537 A * | 12/2000 | Silva et al. | ...... | G01R 31/31903 714/46 |
| 8,990,639 B1 * | 3/2015 | Marr et al. | ............ | G06F 11/30 714/25 |
| 9,026,394 B2 * | 5/2015 | Kube et al. | ........ | G05B 23/0256 324/759.01 |
| 2003/0125908 A1 * | 7/2003 | Wynn et al. | ............ | G06F 11/26 702/186 |
| 2007/0244663 A1 * | 10/2007 | Haemel et al. | ......... | G06F 11/26 702/121 |
| 2008/0120521 A1 * | 5/2008 | Poisson et al. | ..... | G06F 11/2294 714/26 |
| 2008/0184206 A1 * | 7/2008 | Vikutan | .............. | G06F 11/3688 717/127 |
| 2015/0154094 A1 * | 6/2015 | Pasala et al. | ........... | G06F 11/26 714/37 |

OTHER PUBLICATIONS

Koen Claessen and John Hughes, QuickCheck: A Lightweight Tool for Random Testing of Haskell Programs, 12 pages, Copyright 2000, ACM 1-58113-202-6/00/0009.

* cited by examiner

*Primary Examiner* — Yolanda L Wilson
(74) *Attorney, Agent, or Firm* — Haynes and Boone, LLP

(57) ABSTRACT

A system and method for inspecting a testing state includes determining one or more entities to be manipulated during execution of a test of the system, generating an instance of each of the entities using a plurality of entity templates and a plurality of value generators, and executing the test using the generated instances. At least one of the generated instances includes a first value generated randomly. The test is being executed by one or more processors of the system. In some examples, generating an instance of a first one of the entities includes identifying a first one of the entity templates corresponding to a type of the first entity, determining one or more attributes for the first entity based on the first entity template, and generating an instance of each of the attributes using the entity templates and the value generators.

20 Claims, 4 Drawing Sheets

210 — Template Host:
  name = String(format=regexp("host\d\d\d\d\d"));
  root_password = String(default="changeme");
  mac_address = MACAddress();
  environment = Environment();
  architecture = Architecture();
  domain = Domain();
  operatingsystem = OperatingSystem();

220 — Template OperatingSystem:
  name = String(format=regexp("OS__\d\d\d\d"));
  major = Integer();
  minor = Integer();
  family = Choice(["Windows","Linux","Solaris","OSx","iOS","Android"]);
  release = String(format=regexp("release\d\d\d"));

230 — Template Architecture:
  name = String(format=regexp("arch\d\d\d\d\d"));
  operatingsystem = OperatingSystem();

240 — Template Environment:
  name = String(format=regexp("env\d\d\d\d\d"));

250 — Template Domain:
  name = String(format=regexp("domain\d\d\d\d"));

*FIG. 2*

SYSTEM AND METHOD FOR ENTITY GENERATION

BACKGROUND

The present disclosure relates generally to computing systems, and more particularly to the generation of entities used to support testing.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computing systems, whether they are complex servers or simpler standalone computers, tablets, or mobile devices, often include a significant number of interacting processors, hardware devices, and software components. The processors may include single processors, multi-core processors, and/or multiple processors. The hardware devices may include memory, secondary storage devices like flash drives and disk drives, and interfacing devices such as network interface components, graphics cards, hardware accelerators, and data acquisition systems, just to name a few. The software components may include operating systems, drivers for the hardware devices, services, application programming interfaces (APIs), software libraries, user applications, and/or the like.

To help ensure proper operation of the computing system, including the software components, one or more tests are typically designed and run on the computing systems to verify and/or validate the proper operation of the computing systems and the interactions between the processors, hardware devices, and/or software components. When testing a computing system, a test and/or testing infrastructure often generates one or more dummy data objects or entities that may be used to initialize the computing system and/or may be manipulated by the computing system and/or the testing infrastructure during the test. Depending upon the nature of the test and/or the entities, the initial properties and/or attributes of the entities may be random, partially random while being subject to one or more limiting constraints, deterministic, dependent on other entities, and/or some combination of each of these. In some circumstances, different properties and/or attributes may be deterministic and/or dependent on other entities while other properties and/or attributes may be random and/or partially random when, for example, the other properties and/or attributes may be largely irrelevant for the test and/or represent don't care characteristics. In some examples, each of the entities may vary in complexity from numbers and/or strings to complex and/or compound entities that may include as properties and/or attributes other entities. In some examples, the properties and/or attributes which are other entities may, themselves, include properties and/or attributes that may be nested many layers deep. Generating these entities may be quite time consuming and, depending on the care and/or variability when they are created, may contribute to insufficiently thorough testing of the computing system.

Accordingly, it would be desirable to provide systems and methods to improve the ease of generating and/or variability among entities used during testing.

SUMMARY

According to one example, a method of testing a system includes determining one or more entities to be manipulated during execution of a test of the system, generating an instance of each of the entities using a plurality of entity templates and a plurality of value generators, and executing the test using the generated instances. At least one of the generated instances includes a first value generated randomly. The test is being executed by one or more processors of the system.

According to another example, a system includes a memory, a plurality of entity templates stored in the memory, a plurality of value generators stored in the memory, and one or more processors for executing a test for the system. The one or more processors determine one or more entities to be manipulated during execution of the test, generate an instance of each of the entities using the entity templates and the value generators, and execute the test using the generated instances. At least one of the generated instances includes a first value generated randomly.

According to yet another example, a non-transitory machine-readable medium comprising a first plurality of machine-readable instructions which when executed by one or more processors associated with a computing system are adapted to cause the one or more processors to perform a method. The method includes determining one or more entities to be manipulated during execution of a test of the computing system, generating an instance of each of the entities using a plurality of entity templates and a plurality of value generators, and executing the test using the generated instances. At least one of the generated instances includes a first value generated randomly. Generating an instance of a first one of the entities includes identifying a first one of the entity templates corresponding to a type of the first entity, determining one or more attributes for the first entity based on the first entity template, generating an instance of each of the attributes using the entity templates and the value, generators, determining whether a first one of the attributes is a basic type or an entity type, when the first attribute is a basic type, generating a corresponding value for the first attribute using one or more of the value generators, and when the first attribute is an entity type, generating an instance of the first attribute using one or more of the entity templates and one or more of the value generators.

BRIEF DESCRIPTION OF THE DRAWINGS

FIG. 2 is a simplified diagram of exemplary entity templates according to some examples.

In the figures, elements having the same designations have the same or similar functions.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Figure 1:
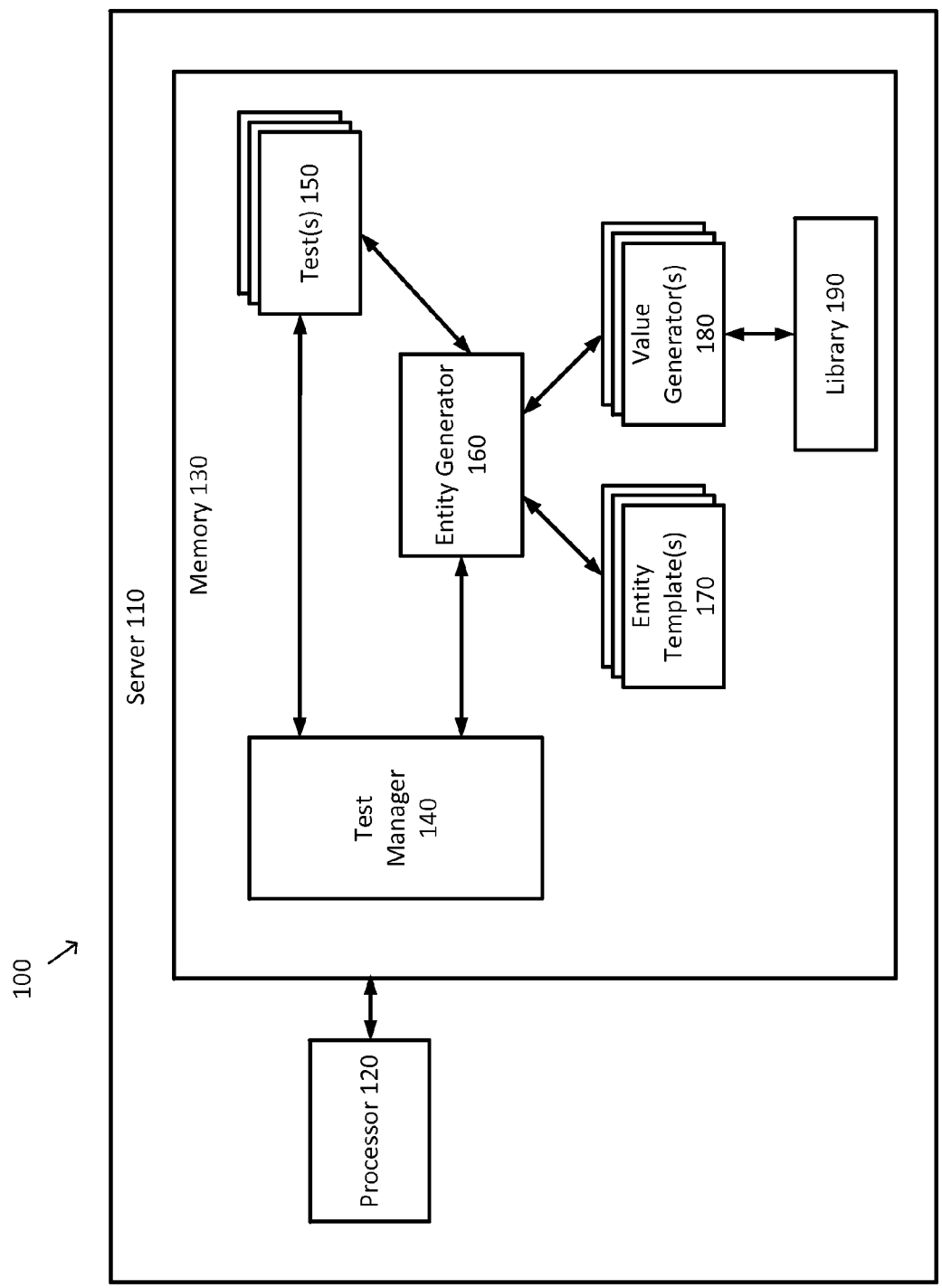
FIG. 1 is a simplified diagram of a computing system according to some examples.

FIG. 1 is a simplified diagram of a computing system 100 according to some examples. As shown in FIG. 1, computing system 100 includes a server or test bed 110. In some examples, server 110 may be a standalone workstation, a personal computer, a tablet, a mobile device, a cluster, a production server, within a virtual machine, and/or the like. Server 110 includes a processor 120 coupled to memory 130. In some examples, processor 120 may control operation and/or execution of hardware and/or software on server 110. Although only one processor 120 is shown, server 110 may include multiple processors, multi-core processors, field programmable gate arrays (FPGAs), application specific integrated circuits (ASICs), and/or the like. Memory 130 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 130 may be used to store various software components for both operating and/or testing the software components and/or the hardware of server 110. To support the testing of server 110, including the hardware and/or software of server 110, the software components include a test manager 140. In some examples, test manager 140 may have responsibility for coordinating the execution of one or more tests 150 and/or initializing, configuring, and/or provisioning the software components and/or hardware of server 110 for each of the tests. In some examples, each of the tests 150 may also assume partial and/or full responsibility for its own initialization, configuration, and/or provisioning. In some examples, the initialization, configuration, and/or provisioning for each of the tests 150 may be specified using one or more configuration files, configuration scripts, and/or the like. To support the initialization, configuration, and/or provisioning, an entity generator 160 is available to test manager 140 and/or the tests 150.

Entity generator 160 is responsible for creating instances of one or more entities as requested by test manager 140 and/or any of the tests 150. In some examples, entity generator 150 may provide an application programming interface (API) that test manager 140 and/or any of the tests 150 may use to request the creation and/or generation of an instance of an entity, multiple instances of a same entity, and/or instances of multiple entities. Each entity generated by entity generator 160 is then returned for use by test manager 140 and/or any of the tests 150. In some examples, each instance of an entity generated by entity generator 160 may be returned as a corresponding data structure, in a serialized form, and/or the like. In some examples, the instance may be specified using eXtensible Markup Language (XML), Javascript Object Notation (JSON), Simple Object Access Protocol (SOAP), and/or the like.

To support the generation of instance of entities, entity generator 160 may use one or more entity templates 170 and/or one or more value generators 180. Each of the entity templates 170 may include a description of the structure of an entity of a specific type. In some examples, each of the entity templates 170 may include an entity name, names of one or more attributes of the entity, and types of each of the one or more attributes. In some examples, the types may be categorized depending on whether the types are basic types or entity types. In some examples, the basic types may include types such as those corresponding to numbers, strings, and/or other types that do not use a template (e.g., types without separate attributes). In some examples, the entity types may include types that are described by their own respective entity template 170. In some examples, because each entity template 170 may include attributes described by other entity templates 170, an entity may include attributes nested to any arbitrary depth. In some examples, the types of each of the one or more attributes may be partially and/or fully constrained using one or more default values for the basic types and/or attributes of the entity types. In some examples, each of the entity templates 170 may be described using a programming and/or scripting language such as C++, Java, JavaScript, Python, and/or the like and/or using a markup language such as XML, JSON, SOAP, and/or the like. In some examples, one or more of the entity templates 170 may be stored in a template repository such as a database, a code store, one or more file system directories, and/or the like. In some examples, one or more of the entity templates 170 may be stored in secondary storage, such as a disk drive, flash drive, distributed storage system, and/or the like. In some examples, one or more of the entity templates 170 may be loaded on demand.

FIG. 2 is a simplified diagram of exemplary entity templates according to some examples. In some examples, each of the entity templates 210-250 in FIG. 2 may be representative of any of the entity templates 170. In some examples, entity templates 210-250 may be representative of potential entity types that may be used to support the testing of distributed computing systems, networked systems, virtual infrastructures, and/or the like.

Entity template 210 shows an example of an entity template for describing attributes for a host in a distributed computing system. The first line of entity template 210 uses the keyword "Template" followed by the name of the entity type, in this case Host. Subsequent lines of entity template 210 introduce an attribute of the Host entity and a type of the attribute separated by an equal sign. Depending upon the particular attribute, the type of the attribute, and any constraints put on values for the attribute, one or more initialization parameters may qualify possible values for the attribute. As shown in FIG. 2, the Host entity includes attributes named name, root_password, mac_address, environment, architecture, domain, and operatingsystem. The name attribute describes the symbolic name for the corresponding instance of the Host and is of type String. The name attribute is also constrained by overriding the default format for a String so that it is formatted using a regular expression. As specified in entity template 210, values for the name attribute include the text "host" followed by five decimal digits, one for each of the "\d"s that appear in the regular expression. A corresponding value generator, as discussed further below, is able to generate a random string of characters that satisfy the formatting of a regular expression. The root_password attribute is also of type String, but rather than having the initial value that is consistent with a regular expression, the value of the root_password is constrained to default to the value "changeme".

The mac_address attribute is of type MACAddress. In practice, a media access control (MAC) address or network hardware address is typically a 48-bit or 64 bit binary number that is typically depicted using 6 pairs of hexadecimal digits (0-9 and a-f) for 48-bit addresses or three groups of four hexadecimal digits with each of the pairs or groups separated by a delimiter such as a dash, a colon, a period, and/or the like. Depending upon where the individual pairs or groups of digits are to be accessed as separate attributes or the entire MAC address considered as a whole, the MACAddress type may be specified by a template (not shown) or as an appropriately formatted String. In some examples, the size (48 or 64 bits) and/or the delimiter may be parameterized with default values (e.g., 48 bits and a colon) that may be overridden to specify MAC addresses with different properties.

The environment, architecture, domain, and operatingsystem attributes are examples of attributes with entity types. In each of these examples, the Host template does not place any additional constraints on the values for the attributes of each instance, although other templates may override these values.

Entity template 220 shows an example of an entity template for describing attributes for an operating system that may be installed on a host. Similar to entity template 210, entity template 220 includes a name attribute of type String to specify the symbolic name for the operating system. In this example, the name attribute is constrained to a pattern with the text "OS" followed by an underscore and four decimal digits. Entity template 220 also includes a release attribute indicating a release name for the operating system and, like the name attribute, is of type String, but constrained to a pattern with the text "release" followed by three random decimal digits.

Entity template 220 also includes a major and a minor attribute, each of type Integer, which will assign an integer value within a default range (e.g., 1 to 10) to specify the major and minor versions of the operating system (e.g., 7.3 or 10.5).

Entity template 220 further includes a family attribute used to indicate the specific type of the operating system. The family attribute is of type Choice indicating that values for the family attribute are selected randomly from the list of options specified. In the examples, shown the operating system family is randomly selected from Windows, Linux, Solaris, OSx, iOS, and Android.

Entity template 230 shows an example of an entity template for describing attributes for an architecture for a host. Like entity templates 210 and 220, entity template 230 includes a name attribute for a symbolic name for the architecture, which is constrained to a pattern of the text "arch" followed by six random decimal digits. Entity template 230 also includes an operatingsystem attribute of type OperatingSystem.

Entity templates 240 and 250 show examples of an entity template for respectively describing an environment and a domain for a host. Each of entity templates 240 and 250 include a single name attribute, which are constrained to the indicated patterns.

As discussed above and further emphasized here, FIG. 2 is merely an example which should not unduly limit the scope of the claims. One of ordinary skill in the art would recognize many variations, alternatives, and modifications. In some examples, entity templates other than entity templates 210-250 are possible, such as entity templates for organizations, software libraries, hardware components, and/or the like. In some examples, entity templates may be created to support any of the tests 150 that use entities with compound attributes and/or nested attributes. In some examples, the language and/or syntax used to describe the entity templates may be expanded and/or extended to include other basic types, other ways of constraining the values for each of the attributes, and/or the like. In some examples, other syntax suitable for identifying a template, identifying attributes, and/or identifying types for the attributes may be used. In some examples, the other syntax may include different keywords, different operators, different delimiters, and/or the like. In some examples, a user of the entity templates 170 may create their own entity templates and/or modify any of the entity templates 170.

Referring back to FIG. 1, when entity generator 160 determines that an entity and/or an attribute is a basic type, a value is generated for that entity and/or attribute using one or more value generators 180. The value generators 180 may include generators for many different types of entities and/or attributes from the simple to the fairly complex. Several examples of basic types whose values may be generated by value generators 180 are included in the entity templates 210-250. One example is a value generator 180 for generating random values of type Integer. In some examples, the integer value generator 180 may default to selecting a random integer in a default range (e.g., 1 to 10). In some examples, the integer value generator 180 may additionally include optional parameters that may be used to override the default range of 1 to 10 to any minimum and maximum values using, for example, syntax similar to "Integer (min=1000,max=9999)" to select a four digit integer.

Another example is a value generator 180 for generating random text strings of type String. In some examples, the string value generator 180 may default to selecting a random number of characters from a default character set, such as UTF8. In some examples, the string value generator 180 may additionally include optional parameters that may be used to override the default ways in which the strings may be generated. As shown in the examples of FIG. 2, a default value may be specified, such as for the root_password attribute, and a constraining format using a regular expression may be specified, such as for the name and release attributes. In some examples, additional optional parameters may be used to set a minimum and/or a maximum string length, change the character set, and/or the like. In some examples, other character sets may include alphabetic, alphanumeric, numeric, latin1, html, Unicode, and/or the like.

Other examples of value generators 180 from entity templates 210-250 are the value generators for selecting a random option for an attribute of type Choice and a random MAC address for an attribute of type MACAddress.

In some examples, value generators 180 may also use other value generators 180 to generate more complex patterns, such as patterns of strings. In some examples, these value generators 180 may include an email address value generator 180 for generating patterns of a random username (a random string) followed by an @ sign and then a random domain (a random string) followed by a period and a random top-level domain (a random string or a random selection from a set of possible top-level domains, such as com, edu, mil, gov, and/or the like). In some examples, these value generators 180 may include an IP address value generator 180 for generating patterns of four random numbers in the range 0 to 255 delimited by periods for IPv4 addresses and eight groups of four hexadecimal digits delimited by colons for IPv6 addresses.

In some examples, value generators 180 may include one or more value generators for generating arrays, lists, and/or collections of other values to support array and similar types. In some examples, a list of user names for a host may be generated as an array of values of type String using the alphanumeric character set.

In some examples, the value generators 180 may be written in any programming and/or scripting language. In some examples, a user of the value generators 180 may create their own value generators and/or modify any of the value generators 180.

To help support the value generators 180, a library 190 of basic functions may be utilized. In some examples, library 190 may include API calls for generating random numbers, selecting random characters from a character set, string manipulation, array or collection manipulation and/or the like. In some examples, library 190 may be part of an operating system running on server 110, a library provided as part of a programming and/or scripting language, custom written functions, and/or the like. In some examples, one or more of the value generators 180 may be stored in a repository such as a database, a code store, one or more file system directories, and/or the like. In some examples, one or more of the value generators 180 may be stored in secondary storage, such as a disk drive, flash drive, distributed storage system, and/or the like. In some examples, one or more of the value generators 180 may be loaded on demand.

The entity templates 170 and/or the value generators 180 may be used to generate instances of entities of all types. In some examples, the value generators 180 may be used to generate instances of the various basic types. In some examples, instances of entity types may be generated by using the entity templates 170 to determine the attributes of the entity types and then using other entity templates 170 and/or value generators 180 to generate values for the attributes. As an example, consider a request to generate an instance of the Host entity type without including any override values, such as by using the exemplary syntax Host( ). An example of a possible instance generated is represented by the following: Host(name="host35123", root_password="changeme", mac_address="19:71:21:70:08:2e", environment=Environment (name="env942740"), architecture=Architecture(name="arch296481", operatingsystem=OperatingSystem(name="OS_4007", major=7, minor=3, family="Linux", release="release038"), domain=Domain(name="domain9902"), operatingsystem=OperatingSystem(name="OS_2294", major=5, minor=1, family="Solaris", release="release512")). This generated instance shows how the instance is generated using a mixture of random, constrained random, and deterministic values. For example, the name attribute of the host is given the value "host35123", which corresponds to the regular expression for the name attribute with a format of the text "host" followed by five random decimal digits. In this instance the random decimal digits resulted in the number 35123, but other instances of type host would have a different random five decimal digits. The root_password attribute is given the value "changeme" deterministically as specified by the host entity template 210. The mac_address attribute is given the value of six random pairs of hexadecimal digits separated by colons, which is consistent with a random 48-bit address. The environment attribute is an example of entity attribute, whose sub-attribute name is given a value consistent with the regular expression for that sub-attribute specified in the environment entity template 240 as the text "env" followed by six random decimal digits. The architecture attribute is another example of an entity attribute whose sub-attributes of name and operating system are given values consistent with the architecture entity template. Because the operatingsystem sub-attribute is also an entity attribute, the operating system entity template 220 is used to determine sub-sub-attributes for the operatingsystem sub-attribute of the architecture attribute. The sub-sub-attributes of the operatingsystem sub-attributes are given values which include a name and a release consistent with the corresponding regular expressions, major and minor values as random integers, and a family value of "Linux" selected randomly from the choice options for the family sub-sub-attribute in the operation system entity template 220. In similar fashion the domain and operatingsystem attributes of the host are given values based on the domain entity template 250 and the operating system entity template 220, respectively.

Alternatively, one or more of the default parameters and/or constraints for the various attributes may be used to override how the entity templates 170 and/or the value generators 180 generate values for the various attributes, sub-attributes etc. As an example, consider a request to generate an instance of the Host entity type without including any override values, such as by using the exemplary syntax Host(root_password="override12345", architecture=Architecture (operatingsystem=OperatingSystem(release="NestedOverride")), domain=Domain(name=String (format=regexp("OvErRiDe\d")))). In this example, optional parameters are added to the entity request that override how the root_password attribute, the release sub-sub-attribute of the operatingsystem sub-attribute of the architecture attribute, and the name sub-attribute of the domain attributed are generated. The result of the request may generate the following result: Host(name="host67802", root_password="override12345", mac_address="ef:34:a6:59:b0:00", environment=Environment (name="env573194"), architecture=Architecture (name="arch0035123", operatingsystem=OperatingSystem (name="OS_8432", major=2, minor=0, family="OSx", release="NestedOverride"), domain=Domain (name="OvErRiDe7"), operatingsystem=OperatingSystem (name="OS_6720", major=4, minor=9, family="Android", release="release297")). Most of the attributes, sub-attributes, sub-sub-attributes are generated using a mixture of random, constrained random, and deterministic values according to the templates, but as is shown, the root_password attribute is given the value "override 12345" as indicated in the entity request, the release sub-sub-attribute of the operatingsystem sub-attribute of the architecture attribute is given the value "NestedOverride", and the release sub-attribute of the domain attribute is given the constrained random value of "OvErRiDe7". Using different combinations of optional parameters may override how different attributes, sub-attributes, etc. are generated. In some examples, it is possible to override how each of the attributes, sub-attributes, etc. are generated including the possibility that each of the attributes, sub-attributes, etc. may be specified deterministically.

As these examples demonstrate, use of the entity templates 170 and/or the value generators 180 provide an easy approach for generating very complex entities using a combination of random, constrained random, and deterministic values with the flexibility to accept the default generation of one or more attributes, sub-attributes, etc. and/or override the default generation with different overriding criteria for each of the attributes, sub-attributes, etc.

Figure 3:
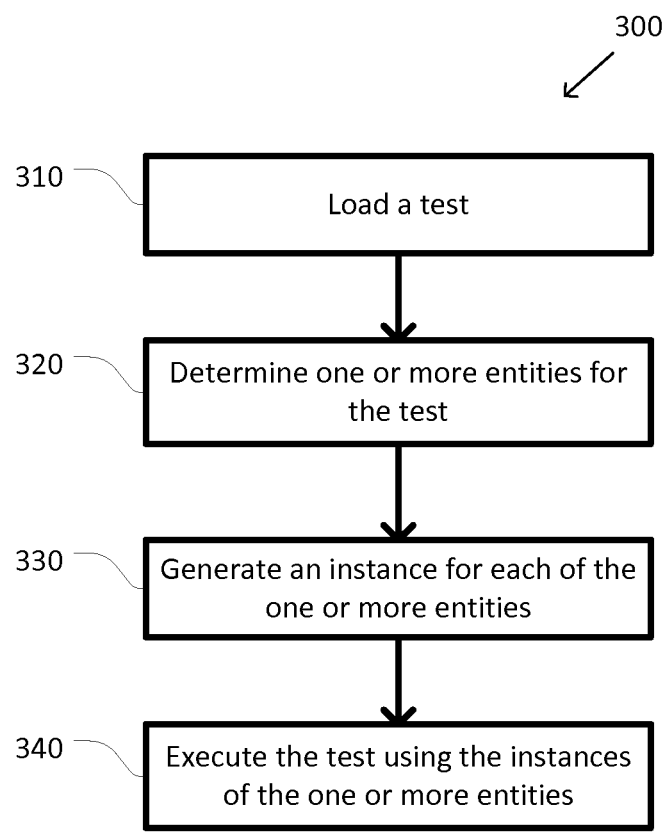
FIG. 3 is a simplified diagram of a method of testing according to some examples.

FIG. 3 is a simplified diagram of a method 300 of testing according to some examples. In some examples, one or more of the processes 310-340 of method 300 may be implemented, at least in part, in the form of executable code stored on non-transient, tangible, machine readable media that when run by one or more processors (e.g., the processor 120 of server 110) may cause the one or more processors to perform one or more of the processes 310-340. In some examples, method 300 may be used by test manager 140 to perform testing of server 110.

At a process 310, a test is loaded. A test manager, such as test manager 140, may select a test, such as one of the tests 150 to be executed. In some examples, a user of the test manager may provide input to the test manager to select the test. Once selected, the test is loaded into memory and is prepared for execution. In some examples, the test may be loaded from a secondary storage device, such as a disk drive, a flash drive, a distributed storage system, and/or the like.

At a process 320, one or more entities for the test are determined. In some examples, the one or more entities may be specified in the form of a request for an instance, which may or may not include the designation of override values in the form of one or more optional parameters. In some examples, the one or more entities may be determined by loading and/or parsing one or more configuration files, configuration scripts, and/or the like that provide a list of desired entities. In some examples, the list of desired entities may be specified in a format that may be interpreted by an entity generator, such as entity generation 160. In some examples, one or more of the entities may be specified to use the default generation for the entities. In some examples, one or more of the entities may be specified with one or more optional parameters and/or settings used to override the default generation as discussed previously. In some examples, the optional parameters and/or settings may be based on one or more values generated during the initialization of one more instances of other entities so that the attributes for two or more of the entities may be the same and/or based on the same random values. In some examples, the entities for the test may be determined as part of the initialization procedure in the test and/or by the test manager on behalf of the test.

At a process 330, an instance for each of the one or more entities is generated. Using one or more entity templates, such as entity templates 170 and/or one or more value generators, such as value generators 180, an instance for each of the entities determined during process 320. In some examples, each of the instances may be generated using an instance generator, such as instance generator 160.

Figure 4:
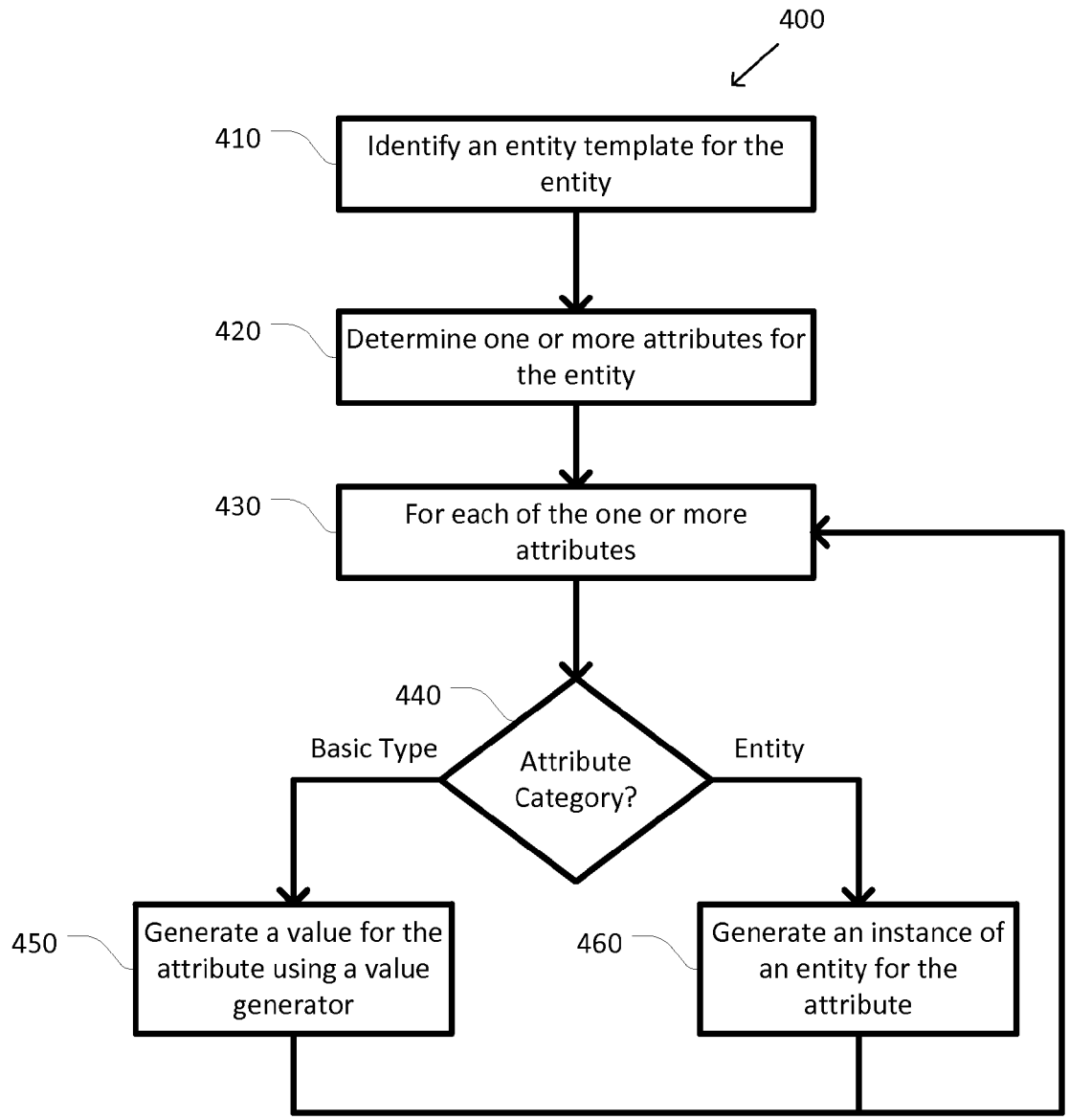
FIG. 4, is a simplified diagram of a method of generating an instance of an entity according to some examples.

FIG. 4, is a simplified diagram of a method 400 of generating an instance of an entity according to some examples. In some examples, one or more of the processes 410-460 of method 400 may be implemented, at least in part, in the form of executable code stored on non-transient, tangible, machine readable media that when run by one or more processors (e.g., the processor 120 of server 110) may cause the one or more processors to perform one or more of the processes 410-460. In some examples, method 400 may be used by entity generator 160. In some examples, method 400 may be used by process 330 to generate the instance of each of the one or more entities.

At a process 410, an entity template for the entity is identified. The entity generator parses the request for the instance of the entity to determine a name of the entity being requested. In most circumstances, the name of the entity being requested may be uniquely identify the type of the entity. In some examples, the parsing of the request may determine that the request includes one or more override values for one or more of the attributes of the entity. In some examples, these override values may be specified using one or more optional parameters. In some examples, the one or more override values may be retained for use during later processes of method 400. Using the name of the entity being requested, the entity generator identifies a corresponding entity template for the entity. In some examples, the entity template may be identified by searching one or more template repositories. In some examples, the corresponding entity template may be loaded for further processing by the entity generator.

At a process 420, one or more attributes for the entity are determined. In some examples, the entity generator may parse the entity template identified during process 410 to determine the one or more attributes for the corresponding entity. In some examples, the determination of the one or more entities may further include determining a type for each of the entities. In some examples, when the entity template identified during process 410 is in a pre-compiled form, the one or more attributes may be determined by executing the compiled code used to generate the attributes.

At a process 430, each of the one or more attributes is processed. Using a loop, or other similar structure, each of the one or more attributes for the entity determined during process 420 is iterated over so that instances of each of the one or more attributes is created. In some examples, the loop may use a loop index, an iterator, and/or the like to iterate through each of the one or more entities.

At a process 440, a category of the attribute is determined. During each pass of the iteration of process 430, a category of the current attribute being processed is determined. In some examples, the category of the current attribute may be determined based on the type of attribute determined from the entity template during process 420. In some examples, the category of the current attribute may be a basic type or an entity type. In some examples, the category of the current attribute may depend on whether a value for an instance of the current attribute may be generated using a value generator, such as any of the value generators 180 or whether the attribute includes sub-attributes as described in a corresponding template. In some examples, the determination of whether the current attribute is categorized as a basic type or an entity type may be determined by searching a template repository to determine whether a corresponding entity template exists for the type of the current attribute and/or searching for the existence of a corresponding value generator for the type of the current attribute. When the value for the instance of the current attribute may be generated using a value generator, the current attribute is categorized as a basic type and the value is generated using a process 450. When the current attribute includes sub-attributes as described in a corresponding template, an instance of the current attribute is generated using a process 460.

At the process 450, a value for the current attribute is generated using a value generator. Based on the type of the current attribute as determined during process 420, a corresponding value generator is determined for the current attribute and the corresponding value generator is executed. Once the corresponding value generator is determined, the corresponding value generator is then executed to generate a value for the current attribute. In some examples, the corresponding value generator may be executed using the default generation for attributes of that type. In some examples, when process 420 determined that the current attribute is further qualified by one or more override values, the corresponding value generator may be executed using the one or more override values. As described previously, the value generated may be random, partially random while being subject to one or more limiting constraints, and/or deterministic. Once a value for the current attribute is generated, the next attribute is processed by returning to process 430 until no further attributes remain.

At the process 460, an instance of an entity for the current attribute is generated. Based on the type of the current attribute as determined during process 420, an instance of an entity of the type of the current attribute is generated. In some examples, the instance may be generated by recursively performing method 400 for the current attribute. In some examples, the instance of the current attribute may be generated using the default generation for attributes of that type. In some examples, when process 420 determined that the current attribute is further qualified by one or more override values, the one or more override values are used to override the default generation of the instance. Once an instance for the current attribute is generated, the next attribute is processed by returning to process 430 until no further attributes remain.

As discussed above and further emphasized here, FIG. 4 is merely an example which should not unduly limit the scope of the claims. One of ordinary skill in the art would recognize many variations, alternatives, and modifications. In some examples, when an entity desired for a test is a basic type, method 400 may be substantially performed using just process 450. In some examples, when process 440 is not able to determine a suitable entity template or value generator for the type of the current attribute, an error and/or exception may be generated and method 400 may be terminated.

Referring back to FIG. 3, at a process 340, the test is executed using the instances of the one or more entities. The instances of the entities generated during process 330 are provided to the test loaded during process 310. In some examples, the instances of the entities may be used to initialize one or more data structures used during the test. In some examples, the instances of the entities may be manipulated by the test as part of the testing procedure.

Although not shown in FIG. 3, method 300 may be partially and/or fully repeated multiple times. In some examples, processes 320 and 330 may be performed periodically during process 340 so that as the test desires additional instances of one or more entities, the additional instances may be generated and provided to the test. In some examples, processes 330 and 340 may be repeated so that the test loaded during process 310 may be executed using different instances of the one or more entities. In this way, a more robust set of testing conditions may be exercised by the test. In some examples, processes 310-340 may be repeated to execute a different test.

Some examples of server 110 may include non-transient, tangible, machine readable media that include executable code that when run by one or more processors (e.g., processor 120) may cause the one or more processors to perform the processes of methods 300 and/or 400 as described above. Some common forms of machine readable media that may include the processes of methods 300 and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative examples have been shown and described, a wide range of modification, change and substitution is contemplated in the foregoing disclosure and in some instances, some features of the examples may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method of testing a system, the method comprising:
determining one or more entities to be manipulated during execution of a test of the system, the test being executed by one or more processors of the system;
generating an instance of each of the entities using a plurality of entity templates and a plurality of value generators; and
executing the test using the generated instances;
wherein:
at least one of the generated instances includes a first value generated randomly; and
generating the first value randomly comprises generating a string with deterministic text and random characters, selecting a random entry from a list of possible values, or generating a random value subject to constraints.

2. The method of claim 1, wherein generating an instance of a first one of the entities comprises:
identifying a first one of the entity templates corresponding to a type of the first entity;
determining one or more attributes for the first entity based on the first entity template; and
generating an instance of each of the attributes using the entity templates and the value generators.

3. The method of claim 2, wherein generating the instance of the first entity further comprises:
determining whether a first one of the attributes is a basic type or an entity type;
when the first attribute is a basic type, generating a corresponding value for the first attribute using one or more of the value generators; and
when the first attribute is an entity type, generating an instance of the first attribute using one or more of the entity templates and one or more of the value generators.

4. The method of claim 3, further comprising:
    determining one or more parameters for overriding default generation of the first attribute; and
    generating the instance of the first attribute based on the one or more parameters.

5. The method of claim 1, wherein the string is specified using a regular expression.

6. The method of claim 1, further comprising determining one or more parameters for overriding default generation of a first entity.

7. The method of claim 6, further comprising generating the instance of the first entity based on the one or more parameters.

8. The method of claim 1, wherein a first one of the entity templates comprises:
    a name for the first entity template; and
    a list comprising one or more attributes and respective types for the attributes.

9. The method of claim 8, wherein the respective types for the attributes include basic types and entity types.

10. The method of claim 8, wherein a first one of the attributes in the list is further specified using one or more parameters.

11. A system comprising:
    a memory;
    a plurality of entity templates stored in the memory;
    a plurality of value generators stored in the memory; and
    one or more processors for executing a test for the system;
    wherein the one or more processors:
        determine one or more entities to be manipulated during execution of the test;
        generate an instance of each of the entities using the entity templates and the value generators; and
        execute the test using the generated instances;
    wherein:
        at least one of the generated instances includes a first value generated randomly; and
        to generate the first value randomly, the one or more processors further generate a string with deterministic text and random characters, select a random entry from a list of possible values, or generate a random value subject to constraints.

12. The system of claim 11, wherein the one or more processors are further configured to:
    identify a first one of the entity templates corresponding to a type of a first one of the entities;
    determine one or more attributes for the first entity based on the first entity template; and
    generate an instance of each of the attributes using the entity templates and the value generators.

13. The system of claim 12, wherein the one or more processors are further configured to:
    determine whether a first one of the attributes is a basic type or an entity type;
    when the first attribute is a basic type, generate a corresponding value for the first attribute using one or more of the value generators; and
    when the first attribute is an entity type, generate an instance of the first attribute using one or more of the entity templates and one or more of the value generators.

14. The system of claim 11, wherein a first one of the entity templates comprises:
    a name for the first entity template; and
    a list comprising one or more attributes and respective types for the attributes;
    wherein the respective types for the attributes include basic types and entity types.

15. The system of claim 14, wherein a first one of the attributes in the list is further specified using one or more parameters.

16. The system of claim 11, wherein the string is specified using a regular expression.

17. The system of claim 11, wherein the one or more processors further determine one or more parameters for overriding default generation of a first entity.

18. A non-transitory machine-readable medium comprising a first plurality of machine-readable instructions which when executed by one or more processors associated with a computing system are adapted to cause the one or more processors to perform a method comprising:
    determining one or more entities to be manipulated during execution of a test of the computing system;
    generating an instance of each of the one or more entities using a plurality of entity templates and a plurality of value generators; and
    executing the test using the generated instances;
    wherein:
        at least one of the generated instances includes a first value generated randomly;
        generating the first value randomly comprises generating a string with deterministic text and random characters, selecting a random entry from a list of possible values, or generating a random value subject to constraints; and
    generating an instance of a first one of the entities comprises:
        identifying a first one of the entity templates corresponding to a type of the first entity;
        determining one or more attributes for the first entity based on the first entity template;
        generating an instance of each of the attributes using the entity templates and the value generators;
        determining whether a first one of the attributes is a basic type or an entity type;
        when the first attribute is a basic type, generating a corresponding value for the first attribute using one or more of the value generators; and
        when the first attribute is an entity type, generating an instance of the first attribute using one or more of the entity templates and one or more of the value generators.

19. The non-transitory machine-readable medium of claim 18, wherein the string is specified using a regular expression.

20. The non-transitory machine-readable medium of claim 18, wherein the method further comprises determining one or more parameters for overriding default generation of a first entity.

* * * * *